United States Patent [19]

Hash

[11] Patent Number: 5,239,241
[45] Date of Patent: Aug. 24, 1993

[54] CONTROLLER FOR AN ELECTRIC MOTOR THAT OPERATES ON DIRECT CURRENT

[75] Inventor: Stuart S. Hash, Fort Wayne, Ind.
[73] Assignee: Xolox Corporation, Fort Wayne, Ind.
[21] Appl. No.: 780,277
[22] Filed: Oct. 18, 1991
[51] Int. Cl.$^5$ ............................................. H02P 1/54
[52] U.S. Cl. ...................................... 318/103; 318/66
[58] Field of Search ................ 318/34, 66, 67, 68, 318/69, 70, 101, 102, 103, 138, 254, 439

[56] References Cited

U.S. PATENT DOCUMENTS

| | | | |
|---|---|---|---|
| 4,289,997 | 9/1981 | Jung et al. | 318/113 |
| 4,641,069 | 2/1987 | Fujioka et al. | 318/625 |
| 4,743,811 | 5/1988 | Katayama | 318/7 |
| 4,776,528 | 10/1988 | West | 318/258 X |
| 4,988,273 | 1/1991 | Faig et al. | 318/254 X |
| 5,055,750 | 10/1991 | Fukui et al. | 318/254 |
| 5,077,506 | 12/1991 | Krause | 318/71 |

*Primary Examiner*—Bentsu Ro
*Attorney, Agent, or Firm*—Barnes & Thornburg

[57] ABSTRACT

This invention relates to a speed control circuit for an electric motor. It includes a controller having a plurality of input circuits and an output circuit adapted to be connected to one of a plurality of direct current motors. The controller includes means responsive to an alternating signal on a selected one of said input circuits for generating and maintaining a unidirectional motor-energizing voltage of predetermined magnitude in the output circuit whereby the speed of said one motor may be controlled. The controller further includes Hall cell devices coupled to a plurality of motors, respectively, for generating the alternating signal in response to energization of a selected motor.

19 Claims, 3 Drawing Sheets

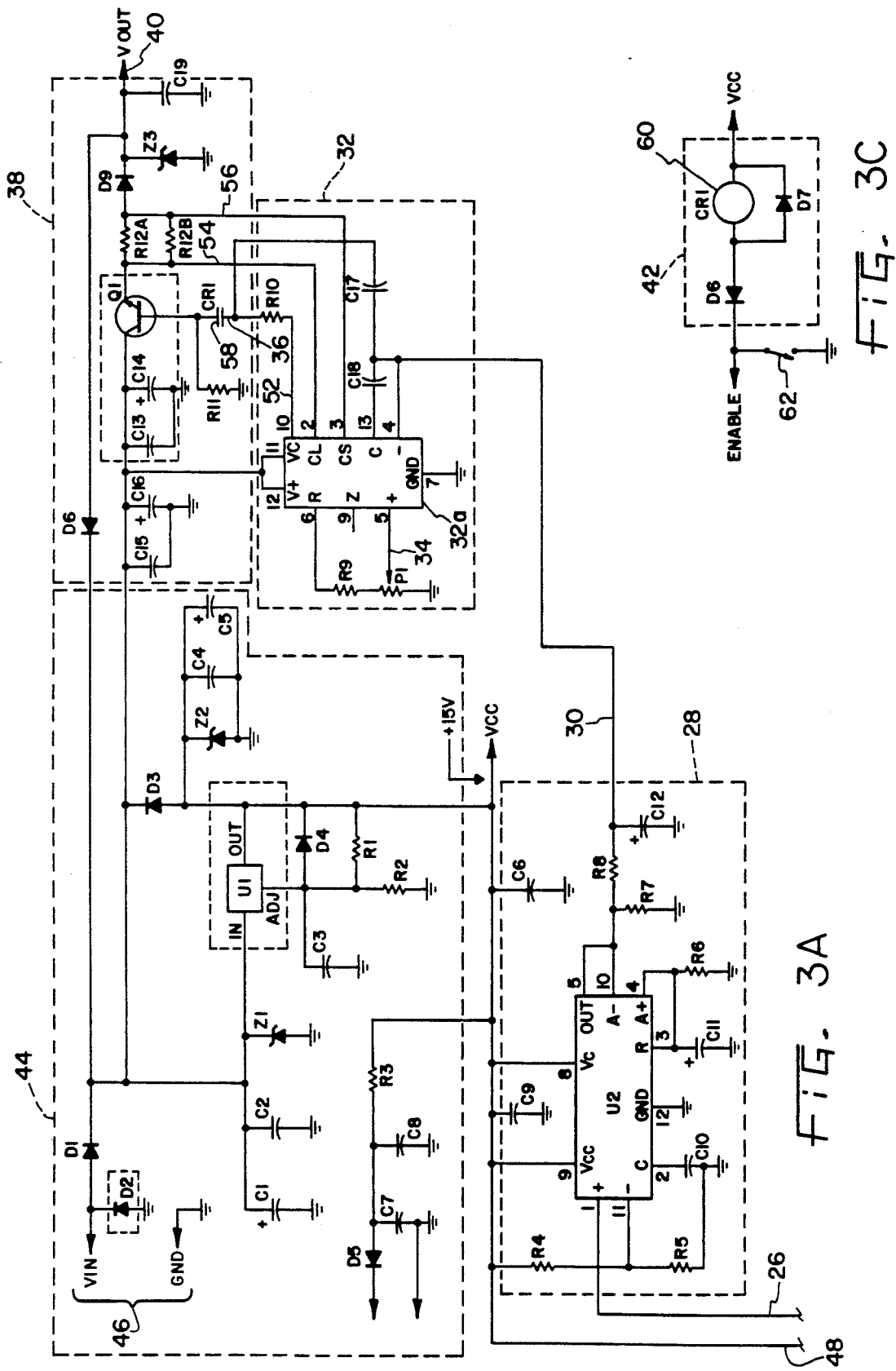

CONTROLLER FOR AN ELECTRIC MOTOR THAT OPERATES ON DIRECT CURRENT

BACKGROUND OF THE INVENTION

The present invention relates to a speed controller for an electric motor that operates on direct current and more particularly to a controller for controlling the speed of any selected one of a plurality of motors without requiring any manual intervention.

SUMMARY OF THE INVENTION

An application of the present invention is for use in a system of motors which are employed in an edible syrup, dispensing apparatus wherein a number (8 for example) of different syrups may be individually selected and dispensed in a given, measured quantity. Each motor drives a gear pump and the syrup is so constituted that if the pump is driven at a common, pre-selected speed for a given period of time, a corresponding predetermined amount of syrup will be dispensed. The controller serves to energize each selected motor in a regulated manner to run at the pre-selected speed; therefore, regardless of the motor selected, the same quantity of syrup will be dispensed.

Generally speaking, the controller senses the speed of an initially energized motor and then adjusts an energizing voltage to the level that establishes and maintains the desired running speed. The motors, which are direct-current operated, have also devices that produce pulses at a rate corresponding to the motor speed. The pulses are sensed and converted into a unidirectional voltage which, after suitable processing, is used to control the energizing voltage applied to the motor. The level of this voltage depends upon the frequency of the pulses; hence, the voltage level is speed responsive as well as being speed controlling.

It is an object of this invention to provide an electronic controller operable to regulate the speed of a selected one of a plurality of motors, that operate on direct current, without requiring any manual intervention.

It is another object of this invention to provide such a controller wherein a motor-energizing voltage is regulated in accordance with the speed of the selected motor.

It is still another object of this invention to provide in such a controller a manual adjustment for pre-selecting the aforesaid motor-energizing voltage.

Other objects will become apparent as the description proceeds.

BRIEF DESCRIPTION OF THE DRAWINGS

FIGS. 3A-3C show a working schematic diagram of the controller shown in FIGS. 1 and 2.

DESCRIPTION OF THE PREFERRED EMBODIMENT

Figure 1:
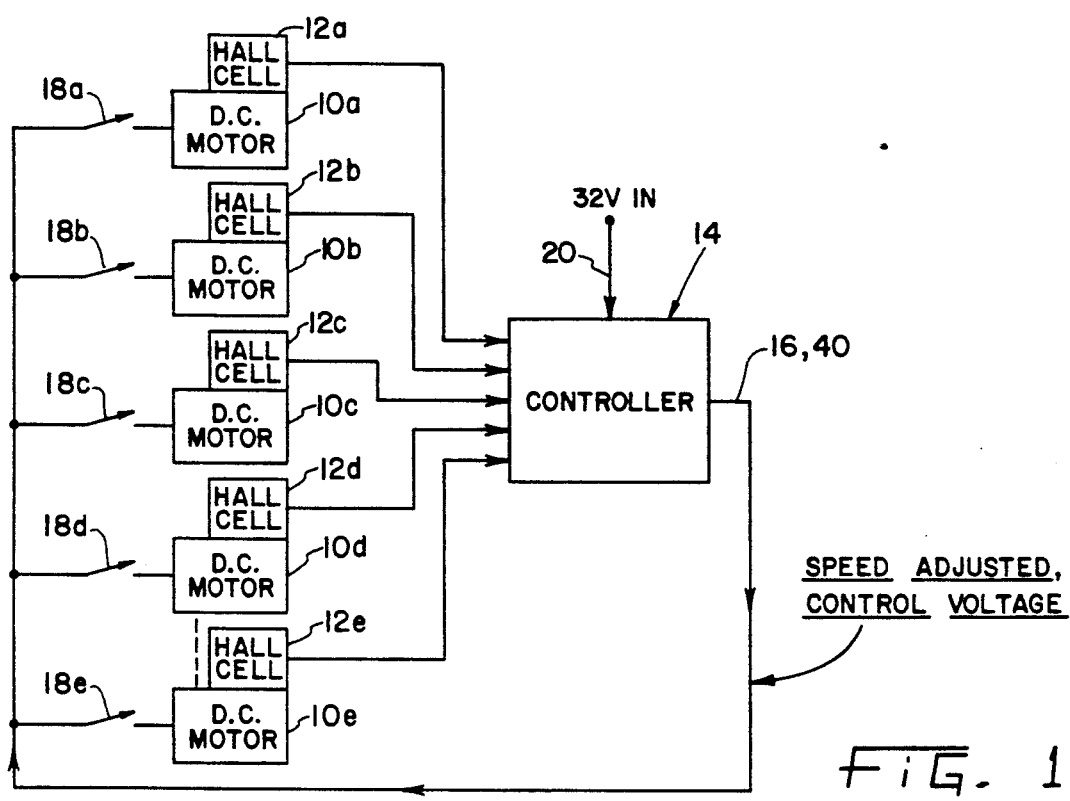
FIG 1 is a block diagram of one embodiment of this invention.

Referring to FIG. 1, a number of different motors that operate on direct current are indicated by the reference numerals 10a, 10b, 10c, 10d and 10e. Mounted on or incorporated within each motor is a Hall cell device 12a, 12b, 12c, 12d and 12e which is of conventional construction and may be like that shown in U.S. Pat. No. 4,908,527. Typically, the Hall cell device incorporates a Hall element along with other semiconductor components, such as an amplifier and switching circuit, into a single, silicon, integrated circuit commonly referred to as a "chip," and to utilize the chip for the purpose of determining the presence and absence of a magnetic field. In the arrangement shown, the Hall cell device is conventionally attached to the motor such that it responds to a permanent magnet that is mounted on a rotating portion of the motor such that the field of the magnet will intercept the Hall device. Typically, the arrangement provides, for example, ten (10) pulses per revolution of the rotating part of the motor such that as the motor rotates at a selected speed, the Hall cell device will produce a series of pulses at a frequency dependent upon the motor speed.

In the embodiment shown in FIG. 1, each Hall device is coupled to the input circuitry of the controller which is generally indicated by the numeral 14. The controller 14 is so arranged that it processes the incoming pulse train derived from the Hall device such that a unidirectional voltage is generated which appears in the output circuit 16 of the controller 14.

Output circuit 16 is coupled back to the motors 10a through 10e via individual normally open electrical switches 18a through 18e. The controller 14, as stated previously, converts the incoming pulse train from one of the Hall devices 12 into a D.C. output voltage which appears in the controller output circuit 16 which in turn is fed back to one of the motors 10 which is activated by closure of a selected switch 18 that is connected thereto.

A source of voltage 20 is connected to the controller 14 and it generally is fed through to the output circuit 16 to provide an operating voltage for the motors when an associated switch 18 is closed.

Generally, in operation, closure of the switch 18a, for example, results in the motor 10a being energized from the voltage source 20. As the motor 10a starts rotating, the associated Hall cell device 12a starts generating a train of pulses that are coupled to the input side of the controller 14. These input pulses are then converted into a unidirectional voltage which is utilized to control the voltage in the output circuit 16 which is used to power the motor 10a itself via the closed switch 18a. The controller 14 is so arranged that it generates a voltage, that is the unidirectional voltage that appears in the output circuit 16, which is proportional to the frequency of the pulse train, the higher the frequency the higher the voltage. Thus, since the frequency of the pulse train is directly dependent upon the speed of the motor 10a, the unidirectional voltage appearing in the output circuit 16 will correspondingly be determined by the same frequency such that the motor 10a is correspondingly energized. By regulating the magnitude of the unidirectional voltage that is produced by the controller 14, once the Hall device generates a frequency high enough to result in the production of this same voltage, it can be seen that the energization and speed of the motor 10a is thus controlled.

The controller 14 is further so arranged that it will automatically set the motor speed regardless of which of the switches 18a through 18e is manipulated.

Figure 2:
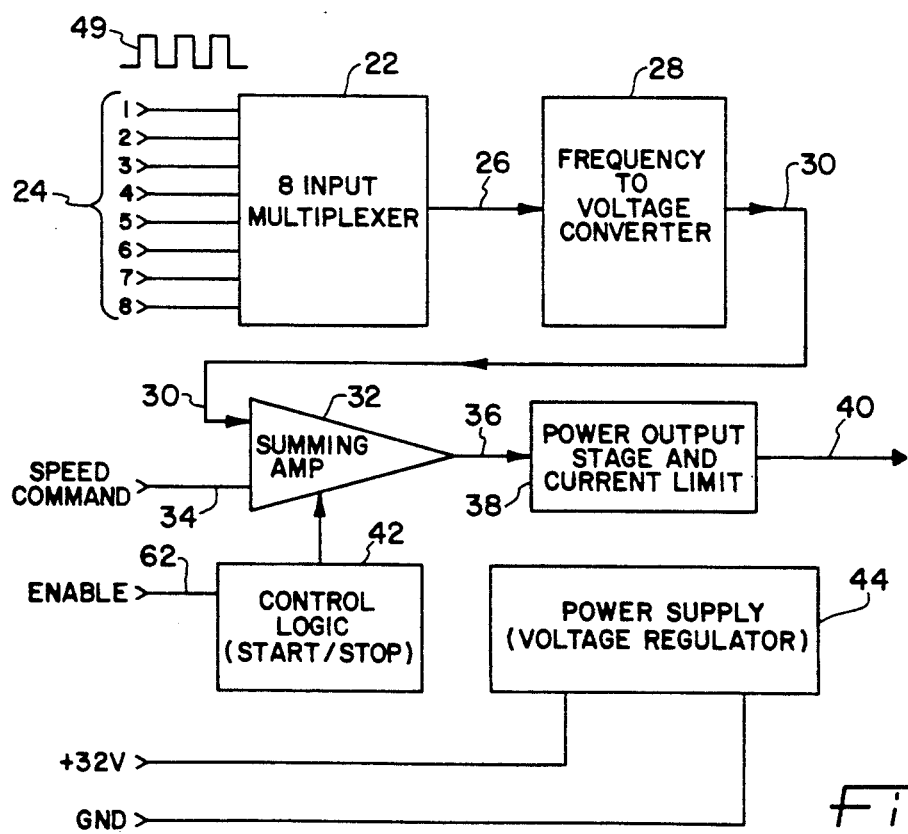
FIG. 2 is another block diagram with the controller portion of FIG. 1 being shown in more detail.

The controller is shown in somewhat more detail in FIG. 2 as including a multiplexer 22 having, for example, eight input circuits 24 as shown. The multiplexer has an output circuit 26 which feeds to the input side of a frequency-to-voltage converter 28, the purpose of this converter 28 being to convert the pulse train of the Hall cell device into a unidirectional voltage.

The output circuit 30 of converter 28 is fed to the input side of a summing amplifier 32 which combines the unidirectional voltage appearing on line 30 with a manually adjusted voltage applied to line 32. The purpose of the voltage applied to the line 34 is to set the operating speed of the motor to be energized.

The output circuit 36 of the summing amplifier is coupled to the input side of the power output stage 38 which amplifies the current output of the summing amplifier 32 sufficiently to serve as the energizing signal for the electric motor. This signal appears on line 40.

A control logic circuit 42 is so coupled to the summing amplifier that the system may be turned "on" and "off" as desired by an operator.

Figure 3B:
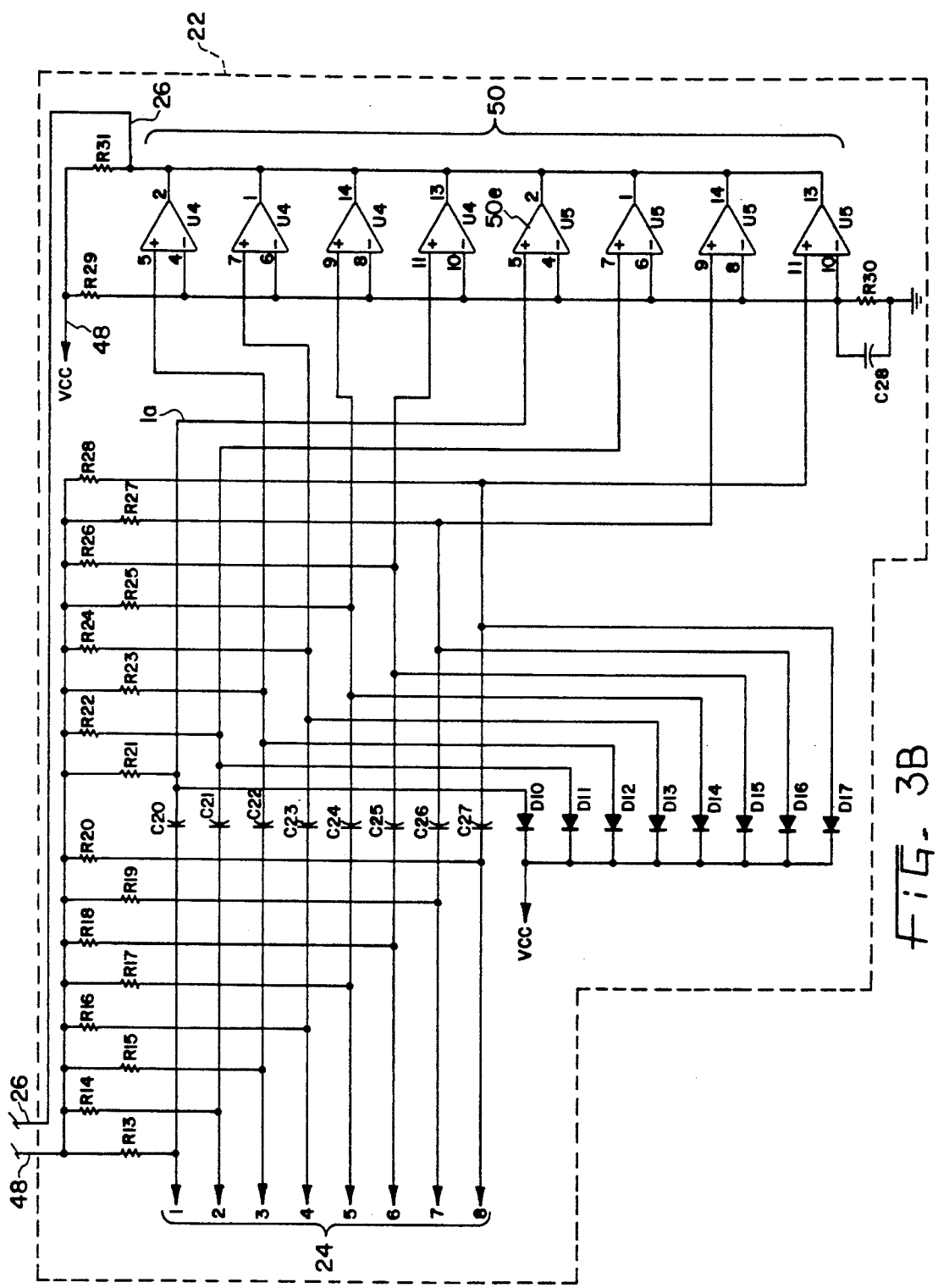

Lastly, a power supply 44 is connected to provide a regulated voltage for many of the circuit elements as appears in the operating circuit diagram of FIGS. 3a and 3b.

With respect to the power supply 44, unregulated D.C. voltage is connected to the input terminals 46, this voltage in the working embodiment being about 35 volts. A lower regulated voltage is developed and applied to the output buss 48. In the working embodiment, this is about 15 volts.

With respect to the multiplexer 22, there are eight input terminals 24 shown, these being connected to parallel circuits that include series connected capacitors $C_{20}$ through $C_{27}$. At the opposite ends of these circuits, connections are made to the non-inverting (+) terminals of eight different voltage comparators 50.

To each of the input circuits are connected pull-up resistors $R_{13}$ through $R_{28}$, the resistors $R_{13}$ through $R_{20}$ being connected on the input sides of the capacitors $C_{20}$ through $C_{24}$ as shown and the resistors $R_{21}$ through $R_{28}$ being connected on the output sides thereof, also as shown. Diodes $D_{10}$ through $D_{17}$ may be used for the purpose of transient suppression.

A bias voltage is applied to the inverting (−) terminals of the voltage comparators 50 by means of a resistance voltage divider composed of resistors $R_{29}$ and $R_{30}$, these being connected between a voltage source $V_{cc}$ and ground.

Operation of the multiplexer 22 may now be further considered. Of importance is the fact that it is not necessary manually to select any particular one of the input circuits 24. These input circuits are isolated from each other by means of the capacitors $C_{20}$ through $C_{27}$ and also the voltage comparators 50 so that the non-selected circuits will not load down the selected circuit. The controller responds to the manual selection of any one of the motors 10a through 10e to control automatically the speed thereof.

In response to the energization of a selected motor, and this is accomplished by closure of one of the switches 18a through 18e, a Hall cell generated pulse train 49 is developed which is coupled to the multiplexer via one of the input lines 24, otherwise indicated by terminals 1 through 8. This pulse train has a frequency corresponding to the speed of the selected motor. The multiplexer 22 routes this pulse train 49 to the voltage converter 28 which produces a unidirectional voltage having a magnitude dependent upon the pulse frequency, hence the motor speed.

With reference to FIGS. 3(a) and 3(b), the multiplexer 22 functions as follows. Assuming a pulse train 44 appears on the first input line 1 of the input circuit 24, and none on those remaining, the resistor $R_{13}$ pulls up the pulse voltage to a peak value of the regulated buss 48. The capacitor $C_{20}$ passes this pulse train to the output side of this first line denoted by the numeral 1a with the voltage being pulled up by the resistor $R_{21}$.

A number of voltage comparators 50 are connected to the respective output lines from the capacitors $C_{20}$ through $C_{27}$ and are biased at the inverting (−) pines by voltage divider $R_{29}$, $R_{30}$, this being at some value less than that on the buss 48. The pulse train 49 (FIG. 2), is conducted through this activated comparator to the converter 28 accordingly.

As stated, the pulse train appears on line 1a. As the voltage of any given pulse drops below the bias voltage on the inverter pin of the respective converter 50, only this comparator 50 is triggered and its output changes state to low and the pulse train 49 is thereby conducted to line 26.

Thus, if a pulse train 49 appears on one of the multiplexer input lines 1 through 8, that pulse train in effect is conducted through to the converter 28 regardless of the off-states of the Hall devices on the remaining input lines of the input circuit 24. This is true because the comparators 50 mutually isolate each input circuit thereto, so only that comparator 50 having a pulse train signal 49 applied thereto will be activated to conduct the pulse train 49 to the voltage converter 28.

The D.C. voltage on the line 30 from the converter 28 is fed to the summing amplifier 32, which is added to the D.C. voltage termed "speed command" in FIG. 2 supplied by manual adjustment of the potentiometer 34 shown within the summing amplifier circuit 32. The chip U3 is a voltage regulator but is connected as a summing amplifier 32.

The summed voltages are coupled via line 52 to the power output stage 38 which provides current gain to operate the selected motor 10a through 10e. The voltage component of the output power of the output stage 38 determines motor speed. The summing amplifier 32 provides the necessary voltage for energizing the motor; however, its current output component is inadequate. The amplifier 24 provides the necessary current gain.

Within the current amplifier 38 are two resistor $R_{12}A$ and $R_{12}B$. These are coupled at the opposite ends thereof by means of lines 54 and 56 to pins 2 and 3 of the summing amplifier chip 32a, U3. These resistors sense the current in the amplifier output line 40 and provides a corresponding voltage which controls the output current of the chip 32a appearing at line 52. In practice, when the current in line 40 reaches and exceeds a predetermined level, the voltage drop across resistors $R_{12}A$ and $R_{12}B$ rises correspondingly causing the current at pin 10 of the chip 32a to lower. This in turn reduces the drive to the transistor $Q_1$ and also the output current on line 40. Thus, this current is limited to a maximum value should the load on line 40 become excessive.

It should be noted that there are a pair of normally open relay contacts 58 in series with the output line 52 of the summing amplifier 32. These contacts are controlled by the control logic circuit 42 by means of a relay coil 60. When a manually operated control switch 62 is closed, the relay coil 60 is energized thereby closing the relay contacts 50. The switch 62 becomes a means for manually turning the total system "on" and "off."

With the system at rest and unenergized, and the starting switch 62 initially open, unregulated voltage appears on the collector of transistor $Q_1$. One of the motors 10a through 10e is selected by closing a respective one of the switches 18a through 18e. Upon closure of switch 62, the selected motor 10a-10e starts accelerating, and a pulse train 49 from the Hall cell device 12a through 12e starts to develop to control motor speed. The capacitor $C_{17}$'s purpose is to provide frequency compensation whereby operation of the motor is stabilized.

One of the salient points of this invention resides in the fact that it is not necessary after the initial selection of one of the motors to also select a particular Hall cell input line 24 in order to achieve control of the motor speed. This is accomplished by the multiplexer 22 automatically.

Recapitulating the operation of the total circuit, and remembering that on of the objectives is to operate each of the motors 10a through 10e at the same speed once the motor is selected by closing a manually operable switch 18a through 18e, a desired one of the switches 18a through 18e is closed. It may be assumed for purposes of this explanation that switch 18a is closed. Unregulated voltage appearing on output line 16 is coupled back to the switch 18a and to the selected motor 10a. This motor is thus energized and starts rotating. As a consequence, the Hall cell device 12a starts generating a pulse train 49 which is fed to the number 1 input line of the input circuit 24 to the multiplexer 22. This train of pulses is coupled by means of capacitor 20 via line 1a to the non-inverting pin 5 of the particular comparator 50e. This comparator during its off-state has its output circuit in high condition. The bias on the inverting (−) pin of the comparator 50e being lower than the amplitude of the pulsed voltage applied to the non-inverting pin results in the comparator 50e being activated to a low state thereby applying the pulse train 49 to the output line 26. This pulse train is fed to the input side of the converter 28 (which includes chip U2) which converts the pulses to direct current voltage which appears o the line 30. The converter circuit 28 is so arranged that it produces a voltage on the line 30 of the magnitude that is proportional to the frequency of the pulses 49 fed thereto.

This unidirectional voltage on line 30 is coupled to the input side of the summing amplifier 32 which in turn produces a corresponding unidirectional voltage on the output line 52 thereof. The chip 32a, U3 is so arranged in the circuit that it will add to the voltage fed to the summing amplifier 32 via the line 30 (or in the alternative subtract) thereby to provide a sum or difference voltage correspondingly on the line 52. The potentiometer 34 thereby serves as a manual speed control.

The relay contacts 58 being closed, the signal on the line 52 is next coupled to the base of the transistor $Q_1$ which now becomes conductive and amplifies the signal so applied. This signal is then applied to the output line 40 which in turn leads back to the particular motor 10a to energize the same.

Since the voltage appearing on the line 40 is dependent upon the frequency of the pulse train 49 hence the motor speed of the motor 10a, and the command voltage appearing at pin 5 of summing amplifier 32, the motor speed is regulated. As stated previously, should the load on the line 40 become excessive, the voltage drop across the two resistors $R_{12}A$ and $R_{12}B$ as fed back to the chip 32a of the summing amplifier 32 will result in the lowering of the bias on the base of the transistor $Q_1$, hence reducing the gain of the amplifier and the voltage applied to the output line 40. This becomes a way to protect the final amplifier circuit 38 against excessive loads, shorts and the like.

In the following are listed component values for a working embodiment of the invention, it being understood that these are given as exemplary only and not as limitative of the invention.

| Resistors | Value |
|---|---|
| $R_1$ | 240 ohms |
| $R_2$ | 2.81 thousand ohms |
| $R_3$ | 150 ohms |
| $R_4, R_8$ | 8.2 thousand ohms |
| $R_5, R_7, R_9$ | 2 thousand ohms |
| $R_6$ | 150 thousand ohms |
| $R_{10}$ | 520 ohms, 2 watt |
| $R_{11}, R_{29}$ | 10 thousand ohms |
| $R_{12}A, R_{12}B$ | 0.82 ohms, 2 watt |
| $R_{13}-R_{28}$ | 10 thousand ohms, 0.25 watt |
| $R_{30}, R_{31}$ | 5 thousand ohms |
| $P_1$ | 2 thousand ohms |
| Capacitors | Value |
| $C_1$ | 100 μf |
| $C_2, C_{19}$ | 0.47 μf |
| $C_3, C_5, C_6$ | 22 μf |
| $C_4, C_8, C_9, C_{13}, C_{15}, C_{28}$ | 0.1 μf |
| $C_7, C_{11}, C_{12}, C_{14}, C_{16}$ | 1 μf |
| $C_{10}$ | 33 μf |
| $C_{17}$ | 4.7 μf |
| $C_{18}$ | 20 pf |
| $C_{20}-C_{27}$ | 1 μf 50 v. |
| Diodes | Type |
| $D_1, D_6, D_9$ | MR851 |
| $D_2$ | 1N1200R |
| $D_3, D_4$ | 1N4934 |
| $D_5, D_7, D_8$ | 1N4004 |
| $D_{10}, D_{17}$ | 1N4148 |
| $Z_1, Z_3$ | 1N5366B |
| $Z_2$ | 1N4746 |
| I, C, Chips | |
| U1 | LM 317HVK |
| U2 | LM 2907 |
| U3 | LM 723 |
| U4, U5 | LM 339 |

While there have been described above the principles of this invention in connection with a specific device, it is to be clearly understood that description is made only by way of example and not as limitation to the scope of the invention.

What is claimed is:

1. A speed control circuit for an electric motor comprising:
   a controller having a plurality of input circuits, said controller having an output circuit adapted to be connected to one of a plurality of direct current motors, said controller including first means responsive to an alternating signal on a selected one of said input circuits for generating and maintaining a unidirectional motor-energizing voltage of predetermined magnitude in said output circuit whereby the speed of said one motor is controlled, said controller also including second means coupled to each of the plurality of motors for generating said alternating signal in response to energization of a selected motor, said first means including a plurality of individual signal circuits, one for each of said plurality of input circuits, said plurality of signal circuits being mutually isolated from each other but having a common output circuit, each individual signal circuit conducting the alternating signal appearing on the input circuit thereof to said common output circuit, said first means also including a converter connected to said common output circuit and responsive to said alternating signal thereon to produce a unidirectional voltage corresponding in magnitude to the frequency of said alternating signal, said first means further including a current gain amplifier coupled between the controller output circuit and said converter and responsive to the converter unidirectional voltage for generating said motor-energizing voltage.

2. The speed control circuit of claim 1 wherein said first means includes speed control means for adjusting the magnitude of the unidirectional voltage produced by said converter whereby the motor-energizing voltage produced by said current gain amplifier is controlled.

3. A speed control circuit for an electric motor comprising:
   a controller having a plurality of input circuits, said controller having an output circuit adapted to be connected to one of a plurality of direct current motors, said controller including first means responsive to an alternating signal on a selected one of said input circuits for generating and maintaining a unidirectional motor-energizing voltage of predetermined magnitude in said output circuit whereby the speed of said one motor is controlled, said controller also including second means coupled to each of the plurality of motors for generating said alternating signal in response to energization of a selected motor, said first means including a plurality of individual signal circuits, one for each of said plurality of input circuits, said plurality of signal circuits being mutually isolated from each other but having a common output circuit, each individual signal circuit conducting the alternating signal appearing on the input circuit thereof to said common output circuit, and wherein each signal circuit includes a blocking capacitor and a signal comparator connected in series and between the respective input circuit and the common output circuit.

4. A control circuit for selectively controlling and regulating the speed of a selected one of a plurality of electric motors, the control circuit comprising:
   a plurality of speed detectors for determining the speed of each of the plurality of motors, each speed detector including means for generating an output signal having a frequency indicative of the speed of an associated motor in response to energization of said associated motor;
   a controller coupled to each of the speed detectors, the controller including a common output and means for processing the output signal from the speed detector associated with said selected motor and a separate speed command signal, to generate a control signal at the common output for powering said selected motor, the controller including a converter coupled to each of the speed detectors, the converter being responsive to the frequency of the output signals from the speed detectors to produce a unidirectional voltage corresponding in magnitude to the frequency of said output signals, the controller also including a current gain amplifier coupled to the converter to generate a voltage for energizing the selected motor; and
   means for selectively coupling the common output of the controller to said selected motor to energize the selected motor.

5. The control circuit of claim 4, wherein the processing means includes means for limiting the magnitude of the control signal generated by the controller to a predetermined maximum value.

6. The control circuit of claim 4, wherein the controller includes a multiplexer having a plurality of inputs, each input being coupled to an output from one of the speed detectors, the multiplexer including means for isolating each one of the inputs to provide a single output, the output of the multiplexer being coupled to the processing means.

7. A control circuit for selectively controlling and regulating the speed of a selected one of a plurality of electric motors, the control circuit comprising:
   a plurality of speed detectors for determining the speed of each of the plurality of motors, each speed detector including means for generating an output signal indicative of the speed of an associated motor in response to energization of said associated motor;
   a controller coupled to each of the speed detectors, the controller including a common output and means for processing the output signal from the speed detector associated with said selected motor and a separate speed command signal, to generate a control signal at the common output for powering said selected motor, the controller also including a multiplexer having a plurality of inputs, each input being coupled to an output from one of the speed detectors, the multiplexer including means for isolating each one of the inputs to provide a single output, the output of the multiplexer being coupled to the processing means; and
   means for selectively coupling the common output of the controller to said selected motor to energize the selected motor.

8. The control circuit of claim 7, wherein each speed detector generates an alternating signal indicative of the speed of the associated motor in response to energization of the associated motor.

9. The control circuit of claim 8, wherein each speed detector is a Hall cell device which generates a pulse train having a frequency dependent on the speed of the associated motor.

10. The control circuit of claim 8, wherein said controller includes a converter coupled to each of the speed detectors, the converter being responsive to said alternating signals from the speed detectors to produce a unidirectional voltage corresponding in magnitude to the frequency of said alternating signal.

11. The control circuit of claim 7, wherein the isolating means includes a blocking capacitor and a signal comparator connected in series between each of the respective inputs of the multiplexer and the single output.

12. The control circuit of claim 7, wherein the processing means includes means for limiting the magnitude of the control signal generated by the controller to a predetermined maximum value.

13. The control circuit of claim 7, wherein each speed detector generates an alternating signal indicative of the speed of the associated motor in response to energization of the associated motor, and said controller includes a converter coupled to each of the speed detectors, the converter being responsive to said alternating signals from the speed detectors to produce a unidirectional voltage corresponding in magnitude to the frequency of said alternating signal.

14. The control circuit of claim 7, wherein the processing means includes a means for converting the output signal from the speed detector associated with the selected motor to a voltage corresponding to the speed of the motor, a summing amplifier having a first input coupled to an output of the converting means and second input coupled to receive said separate speed command signal, the summing amplifier modifying the speed command signal based upon the output of the converting means to produce said control signal.

15. A control circuit for selectively controlling and regulating the speed of a selected one of a plurality of electric motors, the control circuit comprising:
a plurality of speed detectors for determining the speed of each of the plurality of motors, each speed detector including means for generating an output signal indicative of the speed of an associated motor in response to energization of said associated motor;
a controller coupled to each of the speed detectors, the controller including a common output and means for processing the output signal from the speed detector associated with said selected motor and a separate speed command signal, to generate a control signal at the common output for powering said selected motor, the processing means including means for converting the output signal from the speed detector associated with the selected motor to a voltage corresponding to the speed of the motor, a summing amplifier having a first input coupled to an output of the converting means and a second input coupled to receive said separate speed command signal, the summing amplifier modifying the speed command signal based upon the output of the converting means to produce said control signal; and
means for selectively coupling the common output of the controller to said selected motor to energize the selected motor.

16. The control circuit of claim 15, wherein the processing means further includes means coupled to an output of the summing amplifier for limiting the magnitude of the control signal generated by the controller to a predetermined maximum value.

17. The control circuit of claim 15, wherein the converting means includes a frequency to voltage converter.

18. The control circuit of claim 15, wherein the processing means includes means for limiting the magnitude of the control signal generated by the controller to a predetermined maximum value.

19. The control circuit of claim 15, wherein the controller includes a multiplexer having a plurality of inputs, each input being coupled to an output from one of the speed detectors, the multiplexer including means for isolating each one of the inputs to provide a single output, the output of the multiplexer being coupled to the processing means.

* * * * *